US012593307B2

(12) United States Patent
Hong et al.

(10) Patent No.: US 12,593,307 B2
(45) Date of Patent: Mar. 31, 2026

(54) METHOD FOR DETERMINING PAGING REASON

(71) Applicant: BEIJING XIAOMI MOBILE SOFTWARE CO., LTD., Beijing (CN)

(72) Inventors: Wei Hong, Beijing (CN); Ming Zhang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 415 days.

(21) Appl. No.: 18/037,291

(22) PCT Filed: Nov. 17, 2020

(86) PCT No.: PCT/CN2020/129373
§ 371 (c)(1),
(2) Date: May 16, 2023

(87) PCT Pub. No.: WO2022/104512
PCT Pub. Date: May 27, 2022

(65) Prior Publication Data
US 2024/0023060 A1       Jan. 18, 2024

(51) Int. Cl.
*H04W 68/00*       (2009.01)
*H04W 8/18*       (2009.01)
(52) U.S. Cl.
CPC ......... *H04W 68/005* (2013.01); *H04W 8/183* (2013.01)
(58) Field of Classification Search
None
See application file for complete search history.

(56) References Cited

U.S. PATENT DOCUMENTS

| | | | | |
|---|---|---|---|---|
| 2021/0105866 A1* | 4/2021 | Kavuri | .................. | H04W 76/27 |
| 2022/0369211 A1* | 11/2022 | Agiwal | ................. | H04W 48/16 |

FOREIGN PATENT DOCUMENTS

| | | |
|---|---|---|
| CN | 111727629 A | 9/2020 |
| WO | WO 2020209620 A1 | 10/2020 |

OTHER PUBLICATIONS

European Patent Application No. 20961804.0, Search and Opinion dated Jan. 26, 2024, 13 pages.
Samsung, et al. "KI #1 Conclusion" SA WG2 Meeting #142E,S2-2008763, Nov. 2020, 2 pages.
VIVO "E-mail discussion[Post111-e][917][Multi-SIM]Multi-Sim(vivo)" 3GPP TSG-RAN WG2 Meeting #112e, R2-2009325, Nov. 2020, 74 pages.
Indian Patent Application No. 202347039947, Office Action dated Mar. 19, 2024, 7 pages.

* cited by examiner

*Primary Examiner* — Frantz Bataille
(74) *Attorney, Agent, or Firm* — Cozen O'Connor

(57) ABSTRACT
A method for determining a paging cause in a wireless communications network for a multi-card mobile terminal includes determining that a first subscriber identity module (SIM) card in the multi-card terminal is in service communication, and receiving a first paging signaling, wherein the first paging signaling is configured to page a second SIM card in an inactive state; sending a paging cause request to a target base station from the second SIM card, and determining the target paging cause based on a second paging signaling sent by the target base station which includes the target paging cause. The target base station is a base station covering a region where the second SIM card is presently in, and the paging cause request requests a target paging cause for paging the second SIM card.

18 Claims, 8 Drawing Sheets in response to determining that a first subscriber identity module (SIM) card is in service communication, and a target base station pages a second SIM card in an inactive state by means of a first paging signaling, sending a paging cause request to the target base station from the second SIM card ⟩——— 101 determining the target paging cause based on a second paging signaling sent by the target base station, wherein the second paging signaling comprises the target paging cause ⟩——— 102

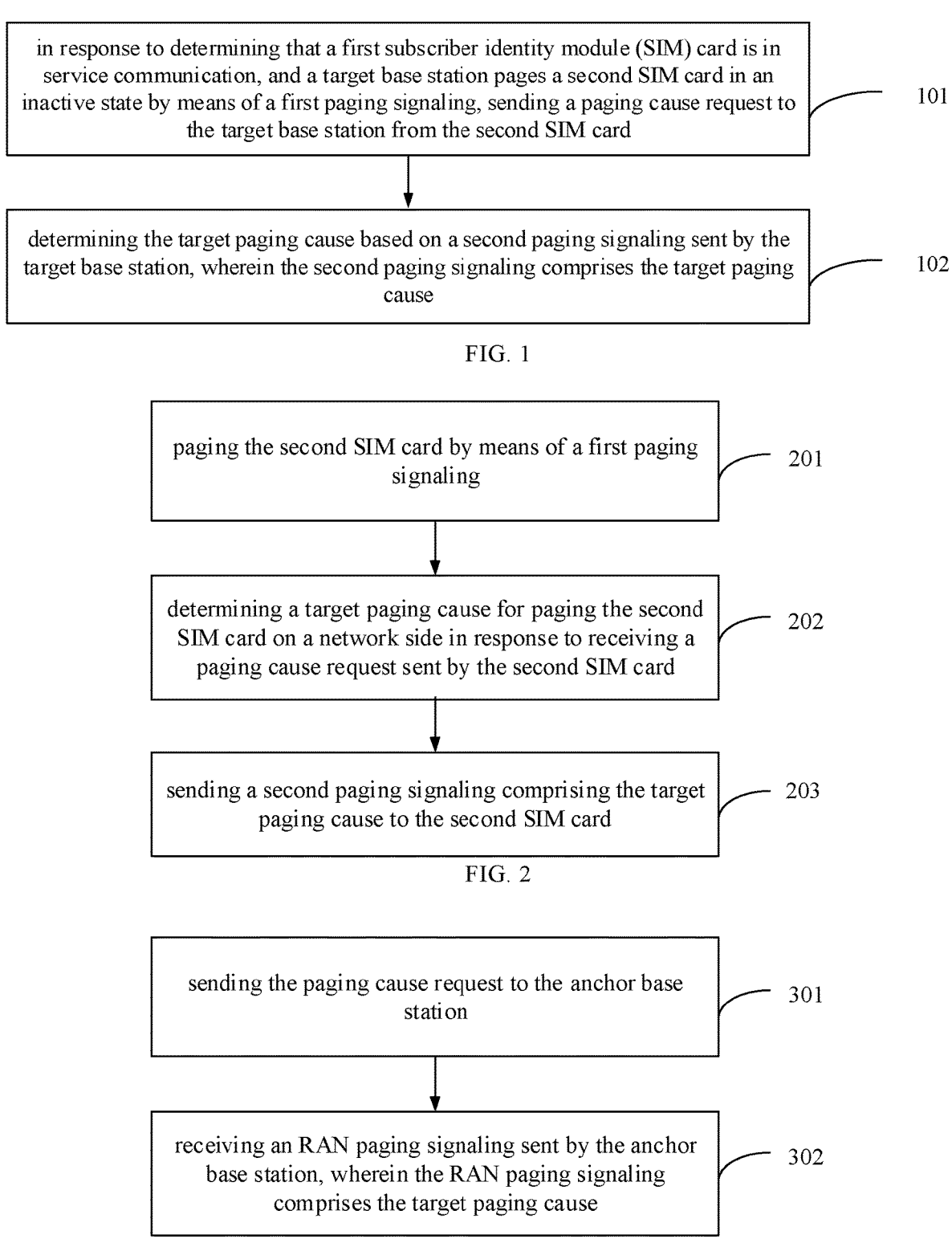

in response to determining that a first subscriber identity module (SIM) card is in service communication, and a target base station pages a second SIM card in an inactive state by means of a first paging signaling, sending a paging cause request to the target base station from the second SIM card — 101 determining the target paging cause based on a second paging signaling sent by the target base station, wherein the second paging signaling comprises the target paging cause — 102

FIG. 1 paging the second SIM card by means of a first paging signaling — 201 determining a target paging cause for paging the second SIM card on a network side in response to receiving a paging cause request sent by the second SIM card — 202 sending a second paging signaling comprising the target paging cause to the second SIM card — 203

FIG. 2 sending the paging cause request to the anchor base station — 301 receiving an RAN paging signaling sent by the anchor base station, wherein the RAN paging signaling comprises the target paging cause — 302

FIG. 3

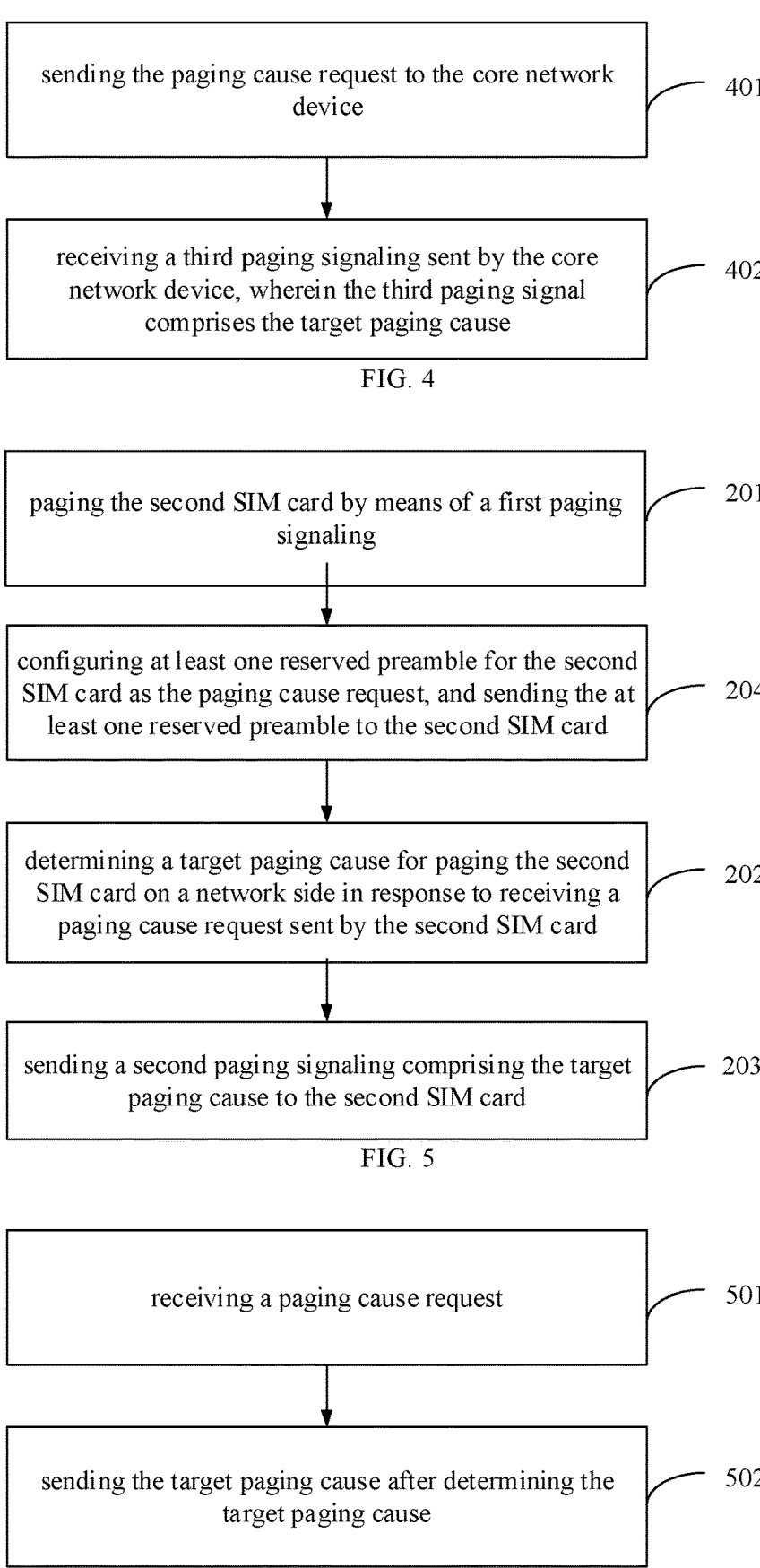

sending the paging cause request to the core network device — 401 receiving a third paging signaling sent by the core network device, wherein the third paging signal comprises the target paging cause — 402

FIG. 4 paging the second SIM card by means of a first paging signaling — 201 configuring at least one reserved preamble for the second SIM card as the paging cause request, and sending the at least one reserved preamble to the second SIM card — 204 determining a target paging cause for paging the second SIM card on a network side in response to receiving a paging cause request sent by the second SIM card — 202 sending a second paging signaling comprising the target paging cause to the second SIM card — 203

FIG. 5 receiving a paging cause request — 501 sending the target paging cause after determining the target paging cause — 502

FIG. 6 determining a target paging cause for paging a second SIM card in response to receiving a paging cause request sent by an anchor base station corresponding to the second SIM card in an inactive state on a multi-card terminal    701 sending the target paging cause to the anchor base station    702

1600

1622 processing
component wireless
transmitter/receiver
component

1624 antenna
component

1626

1700

1722 processing
component wireless
transmitter/receiver
component

1724 antenna
component

1726

METHOD FOR DETERMINING PAGING REASON

CROSS REFERENCE TO RELATED APPLICATIONS

This application is a national phase application based on International Application No. PCT/CN2020/129373, filed Nov. 17, 2020, the entire content of which is incorporated by reference.

TECHNICAL FIELD

The disclosure relates to the field of wireless communication technologies, in particular to a method for determining a paging cause.

BACKGROUND

Mobile terminals with multiple SIM cards are becoming more common as the development of wireless communication technologies continues. At present, processing methods for the multi-card terminals are mainly dependent on specific implementations provided by various terminal manufacturers, resulting in many different terminal behaviors and processing methods. Some of these methods are referred to as dual-card single-standby, dual-card dual-standby single-pass, and dual-card dual-standby dual-pass, for example. The different processing methods create extra work for wireless communication networks.

SUMMARY

According to a first aspect of an embodiment of the present disclosure, there is provided a method for determining a paging cause, performed by a multi-card terminal. The method includes:

determining that a first subscriber identity module (SIM) card is in service communication, and receiving a first paging signaling, in which the first paging signaling is configured to page a second SIM card in an inactive state; sending a paging cause request to a target base station from the second SIM card, in which the target base station is a base station covering a region where the second SIM card is presently in, and the paging cause request requests a target paging cause for paging the second SIM card; and determining the target paging cause based on a second paging signaling sent by the target base station, in which the second paging signaling includes the target paging cause.

According to a second aspect of an embodiment of the present disclosure, there is provided a method for determining a paging cause, performed by a target base station covering a region where a second SIM card in an inactive state on a multi-card terminal is presently in. The method includes:

paging the second SIM card by means of a first paging signaling;

receiving a paging cause request sent by the second SIM card; determining a target paging cause for paging the second SIM card, wherein the paging cause request requests the target paging cause for paging the second SIM card; and sending a second paging signaling including the target paging cause to the second SIM card.

According to a third aspect of an embodiment of the present disclosure, there is provided a method for determining a paging cause, performed by an anchor base station corresponding to a second SIM card in an inactive state on a multi-card terminal. The method includes:

receiving a paging cause request, in which the paging cause request requests a target paging cause for paging the second SIM card; and sending the target paging cause after determining the target paging cause.

It should be noted that, the general description and the detailed description in the following are exemplary and illustrative, and do not constitute the limitation on the present disclosure.

BRIEF DESCRIPTION OF THE DRAWINGS

The drawings herein are incorporated into the specification and constitute a part of the specification, show embodiments in conformity with embodiments of the present disclosure, and explain the principle of the present disclosure together with the specification.

FIG. 1 is a flowchart illustrating a method for determining a paging cause by a multi-card terminal according to an exemplary embodiment of the present disclosure.

FIG. 2 is a flowchart illustrating another method for determining a paging cause by a target base station according to an exemplary embodiment of the present disclosure.

FIG. 3 is a flowchart illustrating another method for determining a paging cause according to an exemplary embodiment of the present disclosure.

FIG. 4 is a flowchart illustrating another method for determining a paging cause according to an exemplary embodiment of the present disclosure.

FIG. 5 is a flowchart illustrating another method for determining a paging cause according to an exemplary embodiment of the present disclosure.

FIG. 6 is a flowchart illustrating another method for determining a paging cause by an anchor base station according to an exemplary embodiment of the present disclosure.

DETAILED DESCRIPTION

Figures 7, 8:
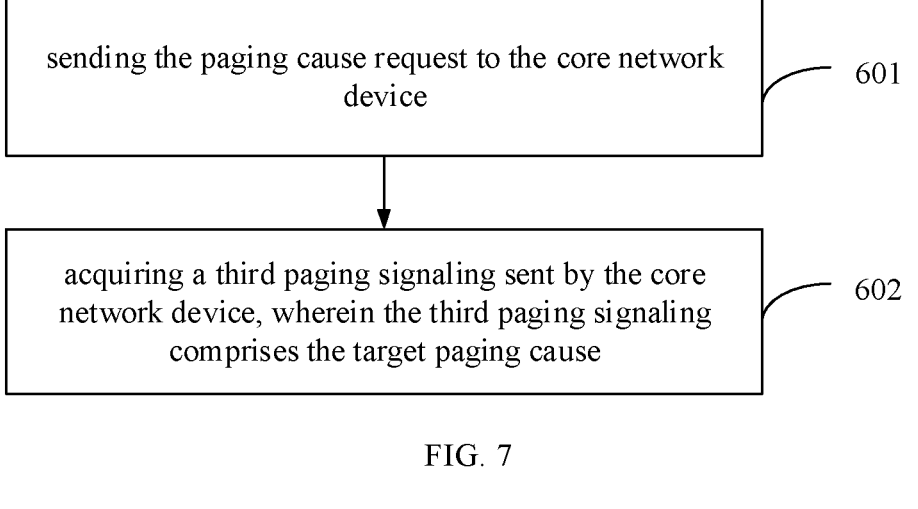
FIG. 7 is a flowchart illustrating another method for determining a paging cause according to an exemplary embodiment of the present disclosure.
FIG. 8 is a flowchart illustrating another method for determining a paging cause by a core network device according to an exemplary embodiment of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

The terms used in the present disclosure are only for the purpose of describing specific embodiments, and are not intended to limit the present disclosure. The singular forms "a", "said" and "the" used in the present disclosure and attached claims are also intended to include plural forms unless the context clearly indicates otherwise. It should also be understood that the term "and/or" used herein refers to and includes any or all possible combinations of one or more associated listed items.

It should be understood that although the terms first, second, third, etc. may be used in the present disclosure to describe various types of information, the information should not be limited to these terms. These terms are only used to distinguish the same type of information from each other. For example, without departing from the scope of the present disclosure, first information may also be referred to as second information, and similarly, the second information may also be referred to as the first information. Depending on the context, for example, the word "if" as used herein may be interpreted as "when" or "upon" or "in response to determining".

Before introducing the solution for determining a paging cause provided by embodiments of the present disclosure, content of an inactive state introduced by 5G (5th generation mobile networks) NR (New Radio) is explained.

When a terminal enters the inactive state, the last service base station stores a context of the terminal and connection information of an NG interface between the terminal and a service core network. An access stratum (AS) of the terminal also stores corresponding context information, including a carrier, an inactive identity, and a home area, etc. The last service base station is an anchor base station corresponding to the terminal.

With this method, a base station is capable of paging a terminal in the inactive state by means of a wireless access network paging mechanism within a configured region. The terminal may quickly recover data transmission based on context information stored on the terminal side and the base station side, and achieves low latency transmission.

In embodiments of the present disclosure, a second SIM card of a multi-card terminal enters the inactive state, and a base station that provides a service for the second SIM card is an anchor base station corresponding to the second SIM card. In a case where a first SIM card of the multi-card terminal is communicating with a network side and the network side pages the second SIM card, a paging cause for paging the second SIM card on the network side may be determined, to subsequently determine whether to give a paging response according to the paging cause.

A method for determining a paging cause provided in the present disclosure is first introduced from a multi-card terminal side below. The multi-card terminal is a terminal supporting installation of two or more SIM cards.

An embodiment of the present disclosure provides a method for determining a paging cause. Referring to FIG. 1. FIG. 1 is a flowchart illustrating a method for determining a paging cause according to an embodiment. The method may be performed by a multi-card terminal and include the following steps.

At step 101, in response to determining that a first subscriber identity module (SIM) card is in service communication, and a target base station pages a second SIM card in an inactive state by means of a first paging signaling, the second SIM card sends a paging cause request to the target base station.

In an embodiment of the present disclosure, the first SIM card is a SIM card that is in the service communication on the multi-card terminal, and the second SIM card is a SIM card in an inactive state on the multi-card terminal. The target base station is a base station covering a region where the second SIM card is presently located. The paging cause request is configured to request a target paging cause for paging the second SIM card from a network side.

At step 102, the target paging cause is determined based on a second paging signaling sent by the target base station. The second paging signaling includes the target paging cause.

In an embodiment of the present disclosure, after receiving the paging cause request, the network side may determine the target paging cause for paging the second SIM card, and send the second paging signaling including the target paging cause to the second SIM card via the target base station, such that the second SIM card may determine the target paging cause based on the second paging signaling.

In the above embodiment, in a case that the SIM card of the multi-card terminal is in the service communication, and the second SIM card in the inactive state on the multi-card terminal are paged on the network side, the second SIM card sends the paging cause request, to request the target paging cause for paging the second SIM card from the network side. Therefore, the multi-card terminal may subsequently determine whether to give a paging response according to the target paging cause, with high availability.

In a possible embodiment, for step 101 above, the second SIM card may send the paging cause request to the target base station in any one of the following implementations.

A first implementation may include that the second SIM card sends the paging cause request to the target base station by means of a first signaling.

Furthermore, the second SIM card may send the first signaling to the target base station after adding the paging cause request to an original or newly added information element of the first signaling.

In an embodiment of the present disclosure, the first signaling may include, but is not limited to, a radio resource control (RRC) signaling. Alternatively, the first signaling may include an RRCResumeRequest signaling or an RRCResumeComplete signaling.

In case of the first signaling including the RRCResumeRequest signaling, it may employ, but is not limited to, adding the paging cause request to an original resumeCause information element of the RRCResumeRequest signaling. Alternatively, it may employ adding the paging cause request to the newly added information element of the RRCResumeRequest signaling.

In case of the first signaling including the RRCResumeComplete signaling, it may employ, but is not limited to, adding the paging cause request to the original information element of the RRCResumeComplete signaling. Alternatively, it may employ adding the paging cause request to the newly added information element of the RRCResumeComplete signaling.

In an example, when adding the paging cause request in the original information element of the first signaling, the original information element may be set with a first preset value corresponding to the paging cause request, such that the network side may determine that the second SIM card has sent the paging cause request based on the first signaling.

For example, when bit values of the original information element being 001, 010, and 011 respectively indicate existing contents in an existing standard, the first preset value may be set as 100. When the bit value of the original information element is set as 100, the network side determines that the second SIM card has sent the paging cause request.

In another example, when adding the paging cause request in the newly added information element of the first signaling, the newly added information element may be set with a second preset value corresponding to the paging cause request, such that the network side may determine that the second SIM card has sent the paging cause request based on the first signaling. Alternatively, the newly added information element may only be configured to indicate the paging cause request, and the second preset value may be as true.

For example, when the newly added information element of the first signaling is set as true, the network side may determine that the second SIM card has sent the paging cause request based on the first signaling. Otherwise, when the newly added information element of the first signaling is set as false, the network side may determine that the second SIM card does not request the paging cause.

The above is only an illustrative explanation. Other implementations that the second SIM card sends the paging cause request to the network side by means of a signaling should also fall within the scope of protection of the present disclosure.

In the above embodiment, the second SIM card in the inactive state on the multi-card terminal may send the paging cause request to the target base station by means of the first signaling, to request the target paging cause for paging the second SIM card from the network side, which is easy to implement and has high availability.

The second implementation may include that the second SIM card sends a reserved preamble as the paging cause request to the target base station.

In an embodiment of the present disclosure, the number of the reserved preambles as the paging cause request may be one or more, which is not limited in the present disclosure.

The second SIM card may send the reserved preamble as the paging cause request to the target base station, to request the target paging cause for paging the second SIM card from the network side. In practical applications, in a case that the number of the reserved preambles is more than one, in order to save terminal resources, the second SIM card may select any one of the reserved preambles as the paging cause request, and send the reserved preamble as the paging cause request to the target base station. After receiving the reserved preamble, the target base station may determine that there is a SIM card requesting the target paging cause for paging the SIM card from the network side.

Furthermore, in order to facilitate the network side to determine which SIM card is requesting to acquire the target paging cause, the second SIM card may send its own identity information to the target base station while sending the reserved preamble. The target base station determines the second SIM card requesting to acquire the target paging cause based on the identity information of the second SIM card and the reserved preamble.

Alternatively, the above reserved preamble may not be configured for random access, only as the paging cause request.

The reserved preamble may be configured by the target base station for the second SIM card. After receiving at least one reserved preamble configured by the target base station, the second SIM card may select any one of the at least one reserved preamble as the paging cause request. Alternatively, the reserved preamble may be predefined in a protocol, and the second SIM card determines at least one reserved preamble defined in the protocol based on a predefined setting, and then selects one of the at least one reserved preamble as the paging cause request.

In the above embodiment, the second SIM card may the reserved preamble as the paging cause request to the target base station, which may also achieve the purpose of requesting the target paging cause for paging the second SIM card from the network side, with high availability. Furthermore, in order to facilitate the network side to send the target paging cause to the second SIM card after determining the target paging cause, the second SIM card may also send the identity information of the second SIM card to the target base station, ensuring that the second SIM card may subsequently acquire the target paging cause sent by the network side.

In a possible embodiment, for step 102 above, after determining the target paging cause on the network side, the target base station sends the target paging cause to the second SIM card by means of a second paging signaling. The second SIM card may determine the target paging cause based on an indication of a target information element in the second paging signaling.

Alternatively, the target information element is an original or newly added information element in a paging signaling. The target information element is configured to indicate the target paging cause.

In an embodiment of the present disclosure, the target paging cause may include, but is not limited to, any one of the followings: presence of a video calling service, presence of a telephone service, presence of an application program notification message to be pushed, presence of a SMS or WeChat message, etc.

The target base station may set the target information element with a corresponding preset value based on different preset values corresponding to different predetermined paging causes, such that the second SIM card may determine the target paging cause. For example, a preset value corresponding to the presence of the video calling service is 00, and a preset value corresponding to the presence of the telephone service is 01, etc., then, when the bit value of the target information element is 00, the second SIM card may determine that the target paging cause is the presence of the video calling service.

In the above embodiment, the second SIM card may determine the target paging cause for paging the second SIM card on the network side based on the second paging signaling including the target paging cause and sent by the target base station, which is easy to implement and has high availability.

In a possible embodiment, after determining the target paging cause through the second SIM card, the multi-card terminal may determine whether to give the paging response based on service requirements.

In an example, the multi-card terminal may determine not to give the paging response in order not to affect communication of the first SIM card.

In another example, in response to a service priority corresponding to a service that the first SIM card is performing is higher than a service priority corresponding to a service of paging the second SIM card, the multi-card terminal may determine not to give the paging response. Otherwise, the multi-card terminals may determine to give the paging response.

In another example, in response to the paging response of the second SIM card reducing a quality of service of the service that the first SIM card is performing, the multi-card terminal may determine not to give the paging response. Otherwise, the multi-card terminals may determine to give the paging response.

In practical applications, the multi-card terminal may also use other methods to determine whether to give the paging response, which will not be limited in the present disclosure.

In the above embodiment, in the case that the first SIM card of the multi-card terminal is in the service communication and the network side pages the second SIM card in the inactive state, the target paging cause for paging the second SIM card on the network side may be determined based on the paging cause request sent by the second SIM card. Furthermore, the multi-card terminal may determine whether to give the paging response based on the target paging cause, with high availability.

A method for determining a paging cause provided in an embodiment of the present disclosure is then introduced from a target base station side below.

An embodiment of the present disclosure provides another method for determining a paging cause. Referring to FIG. 2. FIG. 2 is a flowchart illustrating another method for determining a paging cause according to an embodiment. The method may be performed by a target base station. The target base station is a base station covering a region where a second SIM card in an inactive state on a multi-card terminal is presently in. The method includes the following steps.

At step 201, the second SIM card is paged by means of a first paging signaling.

In an embodiment of the present disclosure, the target base station may directly send a paging message for paging the second SIM card to the second SIM card by means of a paging signaling, such as the first paging signaling.

In an example, the target base station is different from an anchor base station corresponding to the second SIM card. The target base station may page the second SIM card by means of the first paging signaling after receiving an RAN (radio access network) paging signaling for paging the second SIM card and sent by the anchor base station.

In another example, the target base station is the same as an anchor base station corresponding to the second SIM card. The target base station may send the first paging signaling to page the second SIM card when receiving a third paging signaling sent by a core network device. The third paging signaling is a paging signaling for paging the second SIM card that is sent by the core network device to the anchor base station when there is data to be sent to the second SIM card.

At step 202, a target paging cause for paging the second SIM card on a network side is determined in response to receiving a paging cause request sent by the second SIM card.

The paging cause request is configured to request the target paging cause for paging the second SIM card from the network side.

At step 203, a second paging signaling including the target paging cause is sent to the second SIM card.

In an embodiment of the present disclosure, after determining the target paging cause, the target base station may send the target paging cause to the second SIM card by means of the paging signaling. At this time, the second paging signaling sent by the target base station includes the target paging cause.

In the above embodiment, the target base station may determine the target paging cause after receiving the paging cause request sent by the second SIM card in the inactive state, and then send the target paging cause to the second SIM card by means of the second paging signaling, which may realize the purpose of sending the target paging cause to the second SIM card based on the paging cause request sent by the second SIM card, with high availability.

In a possible embodiment, the target base station is different from the anchor base station corresponding to the second SIM card. For example, before the second SIM card switches to the inactive state, the anchor base station, assumed as a base station #1, provides the last service for the second SIM card. After switching to the inactive state, the second SIM card has a change in position and is presently within a coverage range of the target base station assumed as a base station #2. Therefore, the target base station and the anchor base station are two different base stations.

Correspondingly, the target paging cause for paging the second SIM card on the network side may be determined by means of any one of the following implementations.

A first implementation may include directly acquiring the target paging cause that has been determined by the target base station.

In an embodiment of the present disclosure, after receiving the RAN paging signaling for paging the second SIM card sent by the anchor base station, the target base station may determine the target paging cause for paging the second SIM card based on paging content in the RAN paging signaling. After receiving the paging cause request sent by the second SIM card, the target base station may directly acquire the target paging cause that has been determined and then directly send the target paging cause to the second SIM card, rather than acquiring the target paging cause from the anchor base station. Therefore, a duration of acquiring the target paging cause for the second SIM card is shortened, and a signaling resource between base stations is saved.

A second implementation may include acquiring the target paging cause from the anchor base station.

Correspondingly, referring to FIG. 3, FIG. 3 is a flowchart illustrating another method for determining the paging cause according to an embodiment as shown in FIG. 2. The process of determining the target paging cause for paging the second SIM card on the network side in step 202 above may include the following steps.

At step 301, the paging cause request is sent to the anchor base station.

In an embodiment of the present disclosure, the target base station may send the paging cause request to the anchor base station by means of a second signaling based on a preset interface between base stations, including but not limited to an X2 or Xn interface. The paging cause request is configured to request the target paging cause for paging the second SIM card from the network side.

At step 302, a radio access network (RAN) paging signaling sent by the anchor base station is received. The RAN paging signaling incudes the target paging cause.

In an embodiment of the present disclosure, the anchor base station may add the target paging cause to an original or newly added information element of the RAN paging signaling, and then send the RAN paging signaling with the added target paging cause to the target base station, such that the target base station may receive the RAN paging signaling including the target paging cause.

In the above embodiment, in a case that the target base station is different from the anchor base station, the target base station may directly determine the target paging cause or acquire the target paging cause from the anchor base station, to send the target paging cause to the second SIM card subsequently, with high availability.

In a possible embodiment, for step 301 above, the target base station may send the second signaling to the anchor base station after adding the paging cause request to an original or newly added information element of the second signaling. Alternatively, the second signaling may include, but is not limited to, a RETRIEVE UE CONTEXT REQUEST signaling.

In the above embodiment, in a case that the target base station is different from the anchor base station, the target base station may send the second signaling to the anchor base station by adding the paging cause request to the original or newly added information element of the second signaling, which is easy to implement and has high availability.

In a possible embodiment, the target base station may be the same base station as the anchor base station corresponding to the second SIM card. For example, after switching to the inactive state, the second SIM card has no change in position, or has a change in position but is still within a coverage range of the anchor base station, the anchor base station and the target base station are therefore the same base station.

Correspondingly, the target paging cause for paging the second SIM card on the network side may be determined by means of any one of the following implementations.

A first implementation may include directly acquiring the target paging cause that has been determined.

In an embodiment of the present disclosure, the target base station is also the anchor base station, and the target paging cause may be predetermined by the target base station in a case where the core network device has data to be sent to the second SIM card before. After receiving the paging cause request directly sent by the second SIM card, the anchor base station may directly acquire the target paging cause determined.

In an embodiment of the present disclosure, the anchor base station directly determines the target paging cause, rather than acquiring the target paging cause from the core network device. Therefore, a duration of acquiring the target paging cause for the second SIM card is shortened, and a signaling resource between the base station and the core network device is saved.

A second implementation may include acquire the target paging cause from a core network device.

Referring to FIG. 4, FIG. 4 is a flowchart illustrating another method for determining the paging cause according to an embodiment as shown in FIG. 2. The process of determining the target paging cause for paging the second SIM card on the network side in step 202 above may include the following steps.

At step 401, the paging cause request is sent to the core network device.

In an embodiment of the present disclosure, the target base station is also the anchor base station, which may send the paging cause request to the core network device based on a preset interface with the core network device, including but not limited to an NG interface. The paging cause request is configured to request the target paging cause for paging the second SIM card from the network side.

At step 402, a third paging signaling sent by the core network device is received. The third paging signal includes the target paging cause.

In an embodiment of the present disclosure, after determining the target paging cause for paging the second SIM card based on the paging cause request, the core network device may send the target paging cause to the target base station by means of a paging signaling, i.e. the third paging signaling. Alternatively, the core network device also sends the third paging signal to the target base station based on a preset interface with the base station, including but not limited to an NG interface. The target base station receives the third paging signaling including the target paging cause.

In the above implementation example, the target base station, as the anchor base station, may determine the target paging cause by itself or acquire the target paging cause from the core network device, which also achieves the purpose of determining the target paging cause based on the paging cause request sent by the second SIM card.

In a possible embodiment, for step 401 above, when the target base station as the anchor base station sends the paging cause request to the core network device, the target base station may send the paging cause request to the core network device by means of a third signaling.

Alternatively, the target base station may send the third signaling to the core network device after adding the paging cause request to an original or newly added information element of the third signaling. The third signaling may be an RRC signaling, including but not limited to, an RRC inactive transition report signaling or an RRC configuration update signaling.

In the above embodiment, the target base station may send the paging cause request to the core network device by adding the paging cause request to the original or newly added information element of the third signaling and sending the third signaling to the core network device, which is easy to implement and has high availability.

In a possible embodiment, for step 203 above, when sending the second paging signaling including the target paging cause to the second SIM card, the target base station may add the target paging cause to an original or newly added target information element of a paging signaling to obtain the second paging signaling including the target paging cause, and send the second paging signaling to the second SIM card.

The target information element may be an information element for indicating the target paging cause in the paging signaling.

In a possible embodiment, referring to FIG. 5, FIG. 5 is a flowchart illustrating another method for determining the paging cause according to an embodiment as shown in FIG. 2. Before the foregoing step 202, the method may further include the following step.

At step 204, at least one reserved preamble is configured for the second SIM card as the paging cause request, and the at least one reserved preamble is sent to the second SIM card.

In the above embodiment, the target base station may configure the at least one reserved preamble for the second SIM card. The target base station sends the at least one reserved preamble configured to the second SIM card, such that the second SIM card may select one as the paging cause request, achieving the purpose of receiving the paging cause request sent by the second SIM card.

A method for determining a paging cause provided in the present disclosure is then introduced from an anchor base station side below.

An embodiment of the present disclosure provides another method for determining a paging cause. Referring to FIG. 6. FIG. 6 is a flowchart illustrating another method for determining a paging cause according to an embodiment. The method may be performed by an anchor base station corresponding to a second SIM card in an inactive state on a multi-card terminal. The anchor base station is the last base station to provide a service for the second SIM card before the second SIM card in the inactive state on the multi-card terminal switches to the inactive state. The method may include the following steps.

At step 501, a paging cause request is received.

In an embodiment of the present disclosure, the anchor base station may receive the paging cause requests sent by the second SIM card or the target base station. The target base station is a base station covering a region where the second SIM card is presently in. The paging cause request is configured to request a target paging cause for paging the second SIM card from a network side.

At step 502, the target paging cause is sent after determining the target paging cause.

In an embodiment of the present disclosure, the anchor base station may send the target paging cause to the target base station or the second SIM card, and finally send the target paging cause for paging the second SIM card on the network side to the second SIM card.

In the above embodiment, the anchor base station corresponding to the second SIM card may determine the target paging cause and send the target paging cause after receiving the paging cause request, which may realize the purpose of sending the target paging cause to the second SIM card based on the paging cause request sent by the second SIM card in the inactive state on the multi-card terminal.

In a possible embodiment, in response to the second SIM card being presently within a coverage range of the anchor base station, that is, the anchor base station corresponding to the second SIM card being the same as the target base station, step 501 may include receiving the paging cause request sent by the second SIM card.

In the case where the anchor base station and the target base station are the same base station, the anchor base station may directly receive the paging cause request sent by the second SIM card.

In a possible embodiment, in response to the second SIM card presently being within a coverage range of a target base station different from the anchor base station, that is, the anchor base station corresponding to the second SIM card is different from the target base station, step 501 may include: receiving the paging cause request sent by the target base station.

In an embodiment of the present disclosure, in a case where the anchor base station and the target base station are different base stations, the second SIM card may send the paging cause request to the target base station, and the target base station may then send the paging cause request to the anchor base station through a preset interface between the base stations.

In a possible embodiment, for step 502 above, the anchor base station may determine the target paging cause by using the following implementations.

The first implementation may include that the anchor base station directly acquires the target paging cause that has been determined.

In an embodiment of the present disclosure, the anchor base station may pre-determine the target paging cause when determining that the core network device has data to be sent to the second SIM card.

When the anchor base station is the same as the target base station, the anchor base station receives the paging cause request directly sent by the second SIM card, and may directly acquire the target paging cause and then send the target paging cause to the second SIM card. When the anchor base station is different from the target base station, the anchor base station receives the paging cause request sent by the target base station, and may directly acquire the target paging cause that has been determined and send the target paging cause to the target base station.

In an embodiment of the present disclosure, the anchor base station directly determines the target paging cause, rather than acquiring the target paging cause from the core network device. Therefore, a duration of acquiring the target paging cause for the second SIM card is shortened, and a signaling resource between the base station and the core network device is saved.

A second implementation may include acquire the target paging cause from a core network device.

Referring to FIG. 7, FIG. 7 is a flowchart illustrating another method for determining the paging cause according to an embodiment as shown in FIG. 6. Step 502 above may include the following steps.

At step 601, the paging cause request is sent to the core network device.

In an embodiment of the present disclosure, the anchor base station may send the paging cause request to the core network device by means of a third signaling based on a preset interface with the core network device, including but not limited to an NG interface. The paging cause request is configured to request the target paging cause for paging the second SIM card from the network side.

In an example, the anchor base station may send the third signaling to the core network device after adding the paging cause request to an original or newly added information element of the third signaling. Alternatively, the third signaling may be an RRC signaling, and the third signaling may include, but is not limited to, an RRC inactive transition report signaling or an RRC configuration update signaling.

At step 602, a third paging signaling sent by the core network device is received. The third paging signal includes the target paging cause.

In an embodiment of the present disclosure, after determining the target paging cause, the core network device may send the target paging cause to the anchor base station based on a paging signaling, i.e. the third paging signaling.

In the above embodiment, the anchor base station may determine the target paging cause by itself or request the core network device to determine the target paging cause, which is easy to implement and has high availability.

In a possible embodiment, in response to the second SIM card presently being within a coverage range of the anchor base station, the process of sending the target paging cause by the anchor base station in step 502 may include sending a second paging signaling including the target paging cause to the second SIM card.

In an embodiment of the present disclosure, in response to the target base station being the same as the anchor base station, the anchor base station may directly send the target paging cause to the second SIM card by means of the paging signaling, i.e., the second paging signaling, after determining the target paging cause.

In an example, the anchor base station may send the second paging signaling to the second SIM card after obtaining the second paging signaling including the target paging cause by adding the target paging cause to an original or newly added target information element of a paging signaling. The target information element is an information element for indicating the target paging cause in the paging signaling.

In response to the second SIM card presently being within a coverage range of a target base station different from the anchor base station, the process of sending the target paging cause by the anchor base station in step 502 may include sending an RAN paging signaling including the target paging cause to the target base station.

In an embodiment of the present disclosure, in response to the target base station being different from the anchor base station, the anchor base station may send the target paging cause to the target base station by means of the RAN paging signaling after determining the target paging cause. The target base station sends the target paging cause to the second SIM card by means of the second paging signaling.

In an example, the anchor base station may send the RAN paging signaling including the target paging cause to the target base station after adding the target paging cause to an original or newly added information element of the RAN paging signaling, such that the target base station may send the second paging signaling to the second SIM card after obtaining the second paging signaling including the target paging cause by adding the target paging cause to the original or newly added target information element of the paging signaling. The target information element is an information element for indicating the target paging cause in the paging signaling.

In the above embodiment, the anchor base station may send the target paging cause to the second SIM card or target base station after determining the target paging cause, achieving the purpose of sending the target paging cause to the second SIM card.

A method for determining a paging cause provided in the present disclosure is then introduced from a core network device side below.

An embodiment of the present disclosure provides another method for determining a paging cause. Referring to FIG. 8. FIG. 8 is a flowchart illustrating another method for determining a paging cause according to an embodiment. The method may be performed by a core network device, and may include the following steps.

At step 701, a target paging cause for paging a second SIM card is determined in response to receiving a paging cause request sent by an anchor base station corresponding to the second SIM card in an inactive state on a multi-card terminal.

In an embodiment of the present disclosure, the anchor base station is the last base station to provide a service for the second SIM card before the second SIM card switches to the inactive state. The paging cause request is configured to request the target paging cause for paging the second SIM card from a network side.

At step 702, the target paging cause is sent to the anchor base station.

In an embodiment of the present disclosure, the core network device may send the target paging cause to the anchor base station by means of a third paging signaling through a preset interface between the core network device and the base station, including but not limited to an NG interface.

In an example, the core network device may send the third paging signaling to the anchor base station after obtaining the third paging signaling including the target paging cause by adding the target paging cause in an original or newly added information element of a paging signaling.

After determining the target paging cause based on the third paging signaling received, the anchor base station may send a second paging signal including the target paging cause to the second SIM card, or send an RAN paging signaling including the target paging cause to the target base station, such that the target base station may send the second paging signal including the target paging cause to the second SIM card.

In the above embodiment, the core network device may determine the target paging cause for paging the second SIM card in the inactive state on the multi-card terminal based on the paging cause request received, and then send the target paging cause to the anchor base station, thus achieving the purpose of sending the target paging cause to the second SIM card based on the paging cause request sent by the second SIM card, with high availability.

Figure 9:
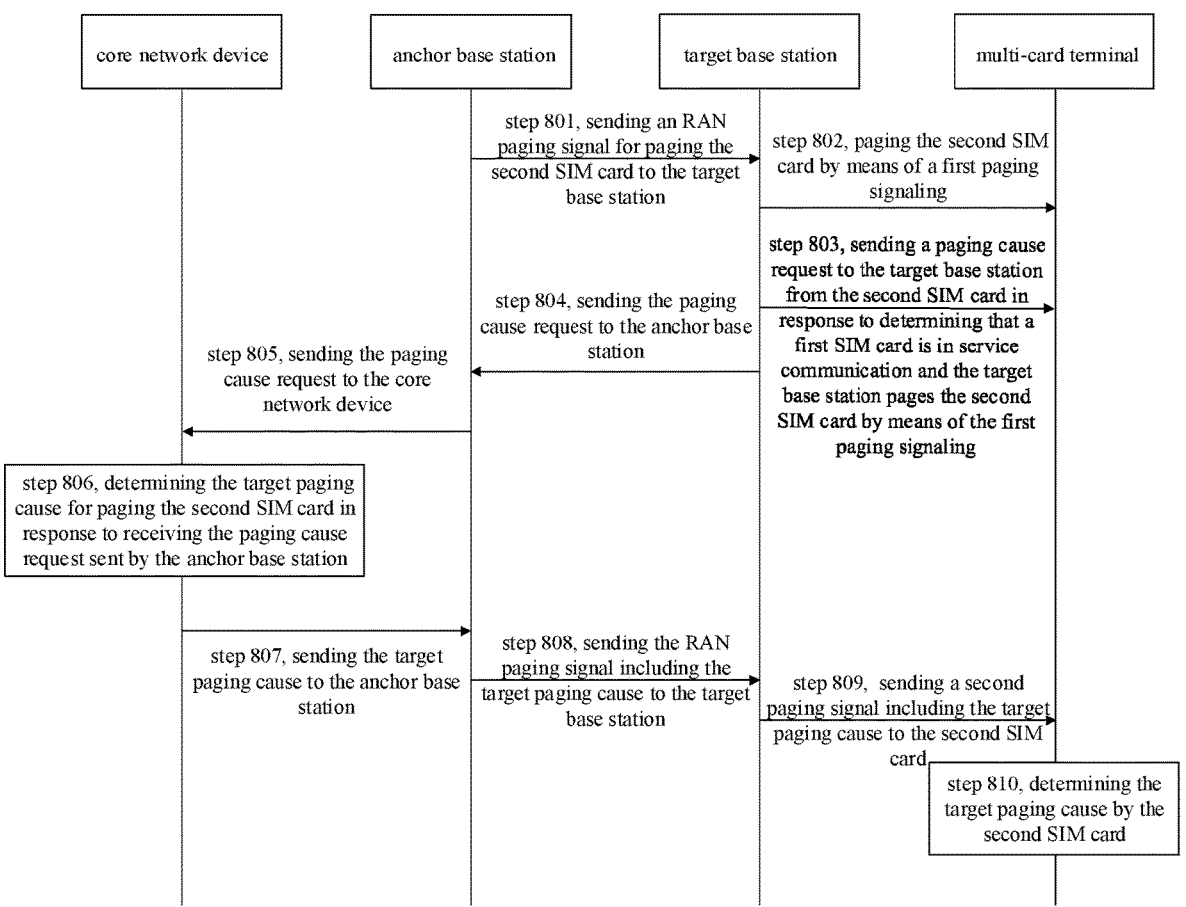
FIG. 9 is a flowchart illustrating another method for determining a paging cause according to an exemplary embodiment of the present disclosure.

In a possible embodiment, referring to FIG. 9, FIG. 9 is a flowchart illustrating another method for determining a paging cause according to an embodiment. In a case that a target base station and an anchor base station corresponding to a second SIM card in an inactive state on a multi-card terminal are different base stations, the method may include the following steps.

At step 801, the anchor base station sends an RAN paging signal for paging the second SIM card to the target base station.

The anchor base station may send the RAN paging signaling to the target base station when determining that a core network device has data to be sent to the second SIM card.

At step 802, the target base station pages the second SIM card by means of a first paging signaling.

At step 803, the multi-card terminal sends a paging cause request to the target base station from the second SIM card in response to determining that a first SIM card is in service communication and the target base station pages the second SIM card by means of the first paging signaling.

In an embodiment of the present disclosure, the paging cause request is configured to request a target paging cause for paging the second SIM card from a network side.

The second SIM card may send a first signaling to the target base station after adding the paging cause request to an original or newly added information element of the first signaling. The first signaling may be an RRC signaling, and may include, but is not limited to, an RRCResumeRequest signaling or an RRCResumeComplete signaling.

Alternatively, the second SIM card may send a reserved preamble as the paging cause request to the target base station. At the same time, the second SIM card may also send identity information of the second SIM card to the target base station.

At step 804, the target base station sends the paging cause request to the anchor base station.

In an embodiment of the present disclosure, the target base station may send, based on a preset interface between base stations, a second signaling to the anchor base station after adding the paging cause request to an original or newly added information element of the second signaling. Alternatively, the second signaling may include, but is not limited to, a RETRIEVE UE CONTEXT REQUEST signaling.

At step 805, the anchor base station sends the paging cause request to the core network device.

In an embodiment of the present disclosure, the anchor base station may send, based on a preset interface between the base station and the core network device, a third signaling to the core network device after adding the paging cause request to an original or newly added information element of the third signaling. Alternatively, the third signaling may be an RRC signaling, and may include but not limited to an RRC inactive transition report signaling or an RRC configuration update signaling.

At step 806, the core network device determines the target paging cause for paging the second SIM card in response to receiving the paging cause request sent by the anchor base station.

At step 807, the core network device sends the target paging cause to the anchor base station.

In an embodiment of the present disclosure, the core network device may send, based on a preset interface between the core network device and the base station, a third paging signaling including the target paging cause to the anchor base station after adding the target paging cause in an original or newly added information element of a paging signaling.

At step 808, the anchor base station sends the RAN paging signal including the target paging cause to the target base station.

In an embodiment of the present disclosure, the anchor base station may send the RAN paging signal including the target paging cause to the target base station after adding the target paging cause to an original or newly added information element of the RAN paging signal.

At step 809, the target base station sends a second paging signal including the target paging cause to the second SIM card.

In an embodiment of the present disclosure, the target base station may send the second paging signaling including the target paging cause to the second SIM card after adding the target paging cause to the original or newly added target information element of the paging signaling. The target information element is an information element for indicating the target paging cause in the paging signaling.

At step 810, the second SIM card determines the target paging cause.

In an embodiment of the present disclosure, the second SIM card may determine the target paging cause based on an indication of the target information element in the second paging signaling.

In the above embodiment, the core network device may determine the target paging cause for paging the second SIM card based on the paging cause request sent by the second SIM card, and send the target paging cause to the second SIM card via the anchor base station and target base station, with high availability.

In a possible embodiment, the above steps 805 to 807 may be replaced by the following step 805' (not shown in FIG. 9):

At step 805', the anchor base station determines the target paging cause based on the third paging signaling.

Furthermore, after directly determining the target paging cause, the anchor base station may directly executes step 808 above. The anchor base station sends the RAN paging signal including the target paging cause to the target base station.

In the above embodiment, the anchor base station corresponding to the second SIM card may directly determine the target paging cause for paging the second SIM card on the network side based on the paging cause request sent by the second SIM card, which may shorten a duration for the second SIM card to determine the target paging cause and save a signaling resource between the base station and the core network.

In a possible embodiment, the above steps 804 to 808 may be replaced by the following step 804' (not shown in FIG. 9):

At step 804', the target base station determines the target paging cause.

Furthermore, after directly determining the target paging cause, the target base station directly executes step 809 above. The target base station sends the second paging signal including the target paging cause to the second SIM card.

In the above embodiment, the target base station may directly determine the target paging cause for paging the second SIM card on the network side based on the paging cause request sent by the second SIM card, which may shorten a duration for the second SIM card to determine the target paging cause and save signaling resources between the base stations and between the base station and the core network.

Figures 10, 11:
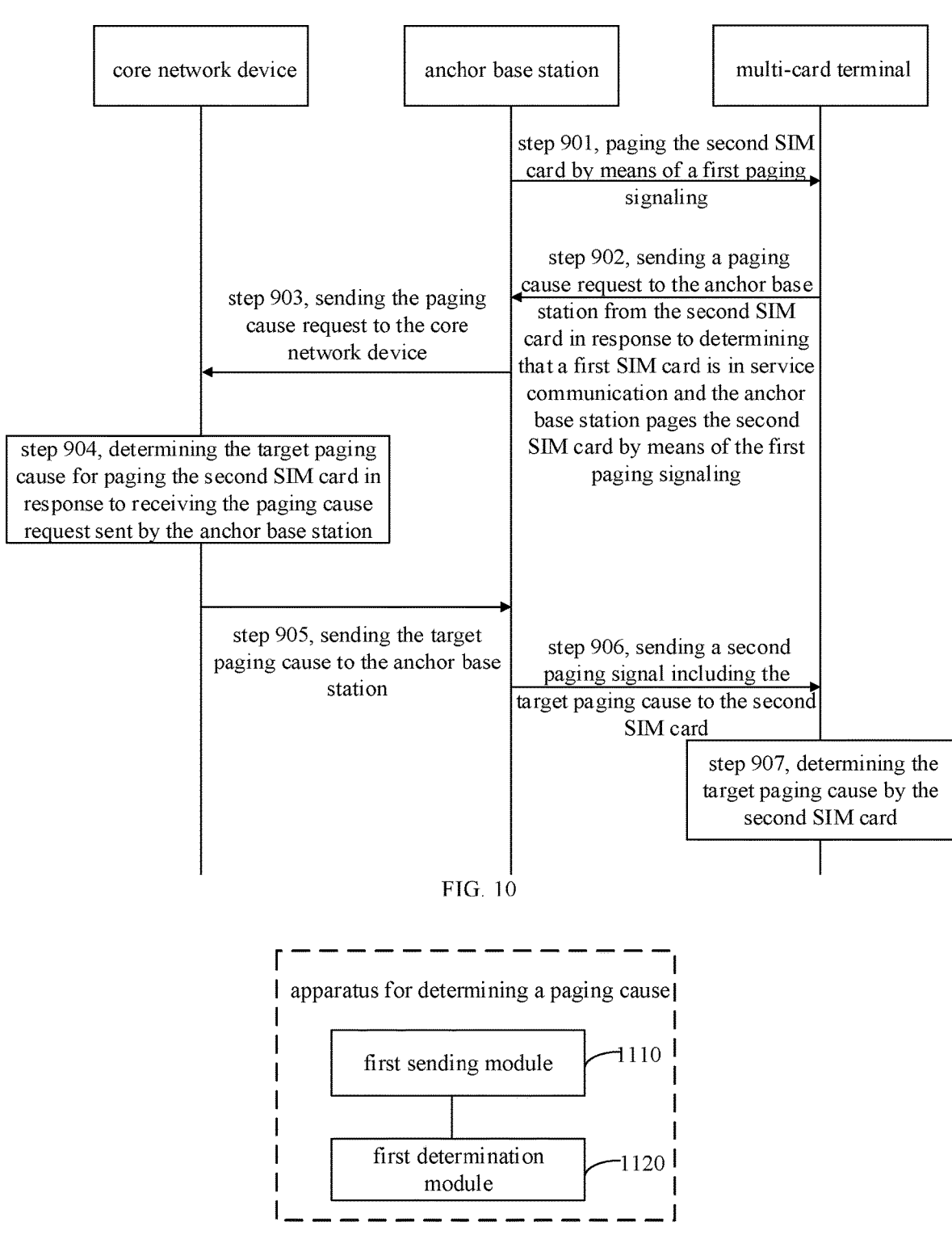
FIG. 10 is a flowchart illustrating another method for determining a paging cause according to an exemplary embodiment of the present disclosure.
FIG. 11 is a block diagram illustrating an apparatus for determining a paging cause applicable to a multi-card terminal according to an exemplary embodiment of the present disclosure.

In a possible embodiment, referring to FIG. 10, FIG. 10 is a flowchart illustrating another method for determining a paging cause according to an embodiment. In a case that a target base station and an anchor base station corresponding to a second SIM card in an inactive state on a multi-card terminal are the same base station, the method may include the following steps.

At step 901, the anchor base station pages the second SIM card by means of a first paging signaling.

The anchor base station may send the first paging signal to page the second SIM card when determining that the core network device has data to be sent to the second SIM card.

At step 902, the multi-card terminal sends a paging cause request to the anchor base station from the second SIM card in response to determining that a first SIM card is in service communication and the anchor base station pages the second SIM card by means of the first paging signaling.

In an embodiment of the present disclosure, the paging cause request is configured to request a target paging cause for paging the second SIM card from a network side. The method of sending the paging cause request by the second SIM card is the similar as the method as described in step 802, and will not be repeated herein.

At step 903, the anchor base station sends the paging cause request to the core network device.

In an embodiment of the present disclosure, the method of sending the paging cause request to the core network device by the anchor base station is the similar as the method as described in step 805, and will not be repeated herein.

At step 904, the core network device determines the target paging cause for paging the second SIM card in response to receiving the paging cause request sent by the anchor base station.

At step 905, the core network device sends the target paging cause to the anchor base station.

In an embodiment of the present disclosure, the method of sending the target paging cause to the anchor base station by the core network device is the similar as the method as described in step 807, and will not be repeated herein.

At step 906, the anchor base station sends a second paging signal including the target paging cause to the second SIM card.

In an embodiment of the present disclosure, the method of sending the second paging signal including the target paging cause to the second SIM card by the anchor base station is the similar as the method as described in step 809, and will not be repeated herein.

At step 907, the second SIM card determines the target paging cause.

In an embodiment of the present disclosure, the second SIM card may determine the target paging cause based on an indication of the target information element in the second paging signaling.

In the above embodiment, in a case where the anchor base station and the target base station are the same base station, the anchor base station may directly receive the paging cause request sent by the second SIM card, acquire the target paging cause from the core network device, and send the target paging cause to the second SIM card, with high availability.

In a possible embodiment, the above steps 903 to 905 may be replaced by the following step 903' (not shown in FIG. 10).

At step 903', the anchor base station determines the target paging cause.

Furthermore, after directly determining the target paging cause, the anchor base station directly executes step 906 above. The anchor base station sends the second paging signal including the target paging cause to the second SIM card.

In the above embodiment, in a case that the anchor base station and the target base station are the same base station, the anchor base station may directly determine the target paging cause for paging the second SIM card, and send the target paging cause to the second SIM card, rather than acquiring the target paging cause from the core network. Therefore, a duration for the second SIM card to determine the target paging cause is shortened and a signaling resource between the base station and core network device is saved.

Correspondingly to the aforementioned method embodiments for implementing an application function, the present disclosure also provides apparatus embodiments for implementing the application function.

Referring to FIG. 11, FIG. 11 is a block diagram illustrating an apparatus for determining a paging cause according to an exemplary embodiment. The apparatus may be applicable for a multi-card terminal, and include:

a first sending module 1110, configured to, in response to determining that a first subscriber identity module (SIM) card is in service communication, and a target base station pages a second SIM card in an inactive state by means of a first paging signaling, send a paging cause request to the target base station from the second SIM card, in which the target base station is a base station covering a region where the second SIM card is presently in, and the paging cause request is configured to request a target paging cause for paging the second SIM card from a network side; and a first determination module 1120, configured to determine the target paging cause based on a second paging signaling sent by the target base station, in which the second paging signaling includes the target paging cause.

Figure 12:
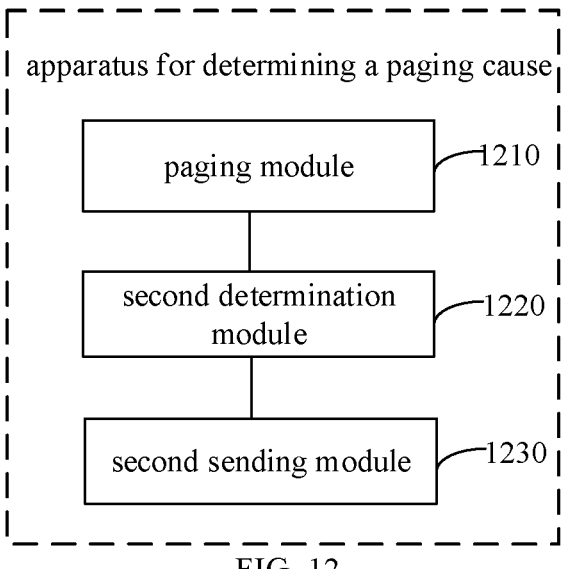
FIG. 12 is a block diagram illustrating another apparatus for determining a paging cause applicable to a target base station according to an exemplary embodiment of the present disclosure.

Referring to FIG. 12, FIG. 12 is a block diagram illustrating an apparatus for determining a paging cause according to an exemplary embodiment. The apparatus may be applicable for a target base station covering a region where a second SIM card in an inactive state on a multi-card terminal is presently in, and include:

a paging module 1210, configured to page the second SIM card by means of a first paging signaling;

a second determination module 1220, configured to determine a target paging cause for paging the second SIM card on a network side in response to receiving a paging cause request sent by the second SIM card, in which the paging cause request is configured to request the target paging cause for paging the second SIM card from the network side; and a second sending module 1230, configured to send a second paging signaling including the target paging cause to the second SIM card.

Figure 13:
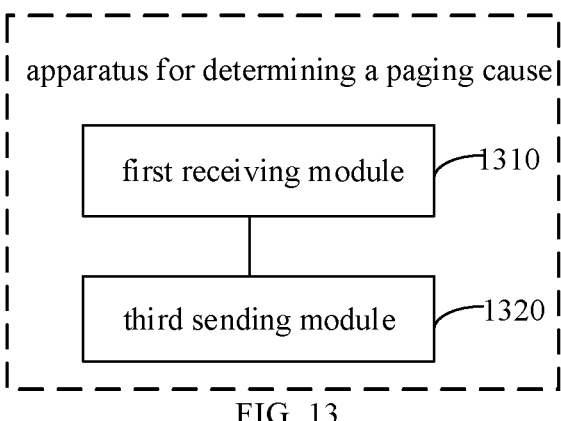
FIG. 13 is a block diagram illustrating another apparatus for determining a paging cause applicable to an anchor base station according to an exemplary embodiment of the present disclosure.

Referring to FIG. 13, FIG. 13 is a block diagram illustrating an apparatus for determining a paging cause according to an exemplary embodiment. The apparatus may be applicable for an anchor base station corresponding to a second SIM card in an inactive state on a multi-card terminal, and include:

a first receiving module 1310, configured to receive a paging cause request, in which the paging cause request is configured to request a target paging cause for paging the second SIM card from a network side; and a third sending module 1320, configured to send the target paging cause after determining the target paging cause.

Figure 14:
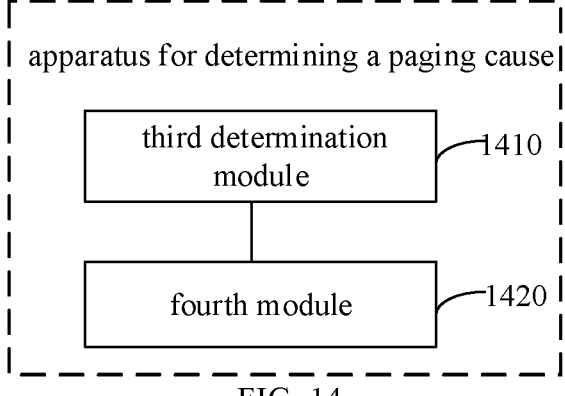
FIG. 14 is a block diagram illustrating another apparatus for determining a paging cause applicable to a core network device according to an exemplary embodiment of the present disclosure.

Referring to FIG. 14, FIG. 14 is a block diagram illustrating an apparatus for determining a paging cause according to an exemplary embodiment. The apparatus may be applicable for a core network device, and include:

a third determination module 1410, configured to determine a target paging cause for paging a second SIM card in response to receiving a paging cause request sent by an anchor base station corresponding to the second SIM card in an inactive state on a multi-card terminal, in which, the paging cause request is configured to request the target paging cause for paging the second SIM card from a network side; and a fourth module 1420, configured to send the target paging cause to the anchor base station.

The apparatus embodiments essentially correspond to the method embodiments, and it is sufficient to refer to the method embodiments for the relevant part of the description. The apparatus embodiments described above are merely schematic, the modules described as separate components may or may not be physically separated, and the components shown as modules may or may not be physical modules, i.e., they may be located in one place or may be distributed to multiple network modules. Some or all of these modules can be selected according to practical needs to achieve the purpose of the solution of the present disclosure. The solution can be understood and implemented by those skilled in the art without inventive works.

Correspondingly, an embodiment of the disclosure also provides a computer readable storage medium having a computer program stored thereon. The computer program is configured to cause any one of the methods for determining the paging cause performed on a multi-card terminal side to be implemented.

Correspondingly, an embodiment of the disclosure also provides a computer readable storage medium having a computer program stored thereon. The computer program is configured to cause any one of the methods for determining the paging cause performed on a base station side to be implemented.

Correspondingly, an embodiment of the disclosure also provides a computer readable storage medium having a computer program stored thereon. The computer program is configured to cause any one of the methods for determining the paging cause performed on a core network device side to be implemented.

Correspondingly, an embodiment of the disclosure also provides an apparatus for determining a paging cause. The apparatus includes:

a processor;

a memory for storing instructions executable by the processor;

in which the processor is configured to implement any one of the methods for determining the paging cause performed on a multi-card terminal side.

Figure 15:
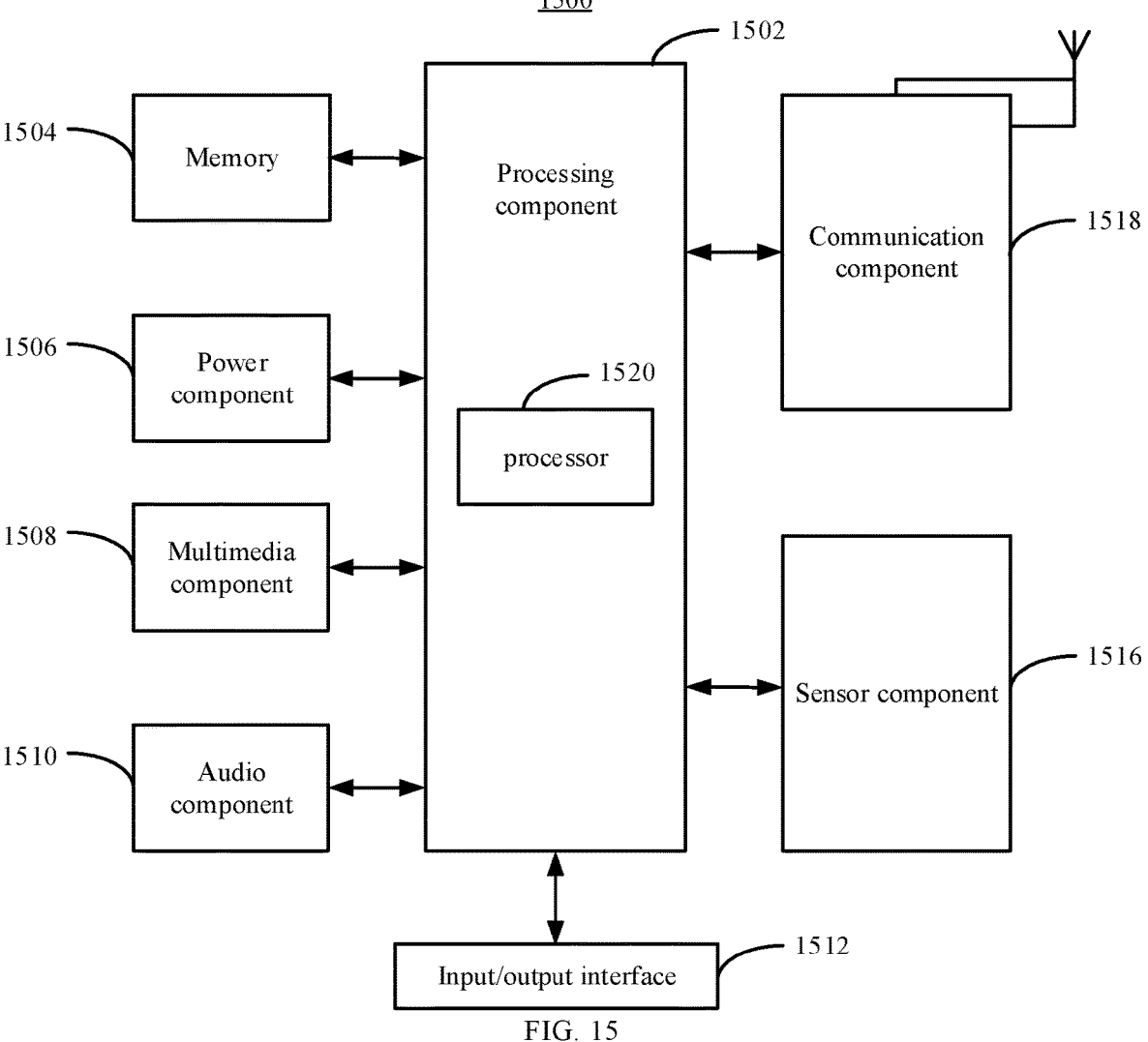
FIG. 15 is a schematic diagram illustrating a structure of a device for determining a paging cause applicable to an electronic device according to an exemplary embodiment of the present disclosure.

FIG. 15 is a block diagram illustrating an electronic device 1500 according to an exemplary embodiment. For example, the electronic device 1500 may be a mobile phone, a tablet, an e-book reader, a multimedia player device, a wearable device, an on-board terminal, an iPad, a smart TV, and other multi-card terminals including more than one SIM card.

As illustrated in FIG. 15, the electronic device 1500 may include one or more of the following components: a processing component 1502, a memory 1504, a power component 1506, a multimedia component 1508, an audio component 1510, an input/output (I/O) interface 1512, a sensor component 1516, and a component 1518 for determining a paging cause.

The processing component 1502 typically controls overall operations of the electronic device 1500, such as the operations associated with display, telephone calls, data communications, camera operations, and recording operations. The processing component 1502 may include one or more processors 1520 to perform instructions for implementing all or part of the steps in the above described method for determining the paging cause. Moreover, the processing component 1502 may include one or more modules which facilitate the interaction between the processing component 1502 and other components. For example, the processing component 1502 may include a multimedia module to facilitate the interaction between the multimedia component 1508 and the processing component 1502. For another example, the processing component 1502 may read executable instructions from the memory to implement the steps of the method for determining the paging cause provided by the above embodiments.

The memory 1504 is configured to store various types of data to support the operation of the electronic device 1500. Examples of such data include instructions for any applications or methods operated on the electronic device 1500, contact data, phonebook data, messages, pictures, video, etc. The memory 1504 may be implemented using any type of volatile or non-volatile memory devices, or a combination thereof, such as a Static Random-Access Memory (SRAM), an Electrically-Erasable Programmable Read Only Memory (EEPROM), an Erasable Programmable Read Only Memory (EPROM), a Programmable Read-Only Memory (PROM), a Read Only Memory (ROM), a magnetic memory, a flash memory, a magnetic or optical disk.

The power component 1506 provides power to various components of the electronic device 1500. The power component 1506 may include a power management system, one or more power sources, and any other components associated with the generation, management, and distribution of power in the electronic device 1500.

The multimedia component 1508 includes a screen providing an output interface between the electronic device 1500 and the user. In some embodiments, the multimedia component 1508 includes a front-facing camera and/or a rear-facing camera. When the electronic device 1500 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 1510 is configured to output and/or input audio signals. For example, the audio component 1510 includes a microphone (MIC) configured to receive an external audio signal when the electronic device 1500 is in an operation mode, such as a call mode, a recording mode, and a voice recognition mode. The received audio signal may be further stored in the memory 1504 or transmitted via the component 1518 for determining the paging cause. In some embodiments, the audio component 1510 further includes a speaker to output audio signals.

The I/O interface 1512 provides an interface between the processing component 1502 and peripheral interface modules, such as a keyboard, a click wheel, buttons, and the like. The buttons may include, but are not limited to, a home button, a volume button, a starting button, and a locking button.

The sensor component 1516 includes one or more sensors to provide status assessments of various aspects of the electronic device 1500. For instance, the sensor component 1516 may detect an open/closed status of the electronic device 1500, relative positioning of components, e.g., the display and the keypad, of the electronic device 1500, a change in position of the electronic device 1500 or a component of the electronic device 1500, a presence or absence of user contact with the electronic device 1500, an orientation or an acceleration/deceleration of the electronic device 1500, and a change in temperature of the electronic device 1500. The sensor component 1516 may include a proximity sensor configured to detect the presence of nearby objects without any physical contact. The sensor component 1516 may also include a light sensor, such as a Complementary Metal Oxide Semiconductor (CMOS) or Charge-coupled Device (CCD) image sensor, for use in imaging applications. In some embodiments, the sensor component 1516 may also include an accelerometer sensor, a gyroscope sensor, a magnetic sensor, a pressure sensor, or a temperature sensor.

The component 1518 for determining the paging cause is configured to facilitate communication, wired or wirelessly, between the electronic device 1500 and other devices. The electronic device 1500 can access a wireless network based on a communication standard, such as Wi-Fi, 2G 3G, 4G, 5G, or 6G, or a combination thereof. In an exemplary embodiment, the component 1518 for determining the paging cause receives a broadcast signal or broadcast associated information from an external broadcast management system via a broadcast channel. In an exemplary embodiment, the component 1518 for determining the paging cause further includes a Near Field Communication (NFC) module to facilitate short-range communication. For example, the NFC module may be implemented based on a Radio Frequency Identification (RFID) technology, an Infrared Data Association (IrDA) technology, an Ultra-Wide Band (UWB) technology, a Blue Tooth (BT) technology, and other technologies.

In exemplary embodiments, the electronic device 1500 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, for performing the above described method for determining the paging cause.

In exemplary embodiments, there is also provided a non-transitory computer readable storage medium including instructions, such as the memory 1504, executable by the processor 1520 in the electronic device 1500, for performing the above method for determining the paging cause. For example, the non-transitory computer-readable storage medium may be a ROM, a Random Access Memory (RAM), a CD-ROM, a magnetic tape, a floppy disc, and an optical data storage device.

Correspondingly, an embodiment of the disclosure also provides an apparatus for determining a paging cause. The apparatus includes:

a processor;

a memory for storing instructions executable by the processor;

in which the processor is configured to implement any one of the methods for determining the paging cause performed on a based station side.

Figure 16:
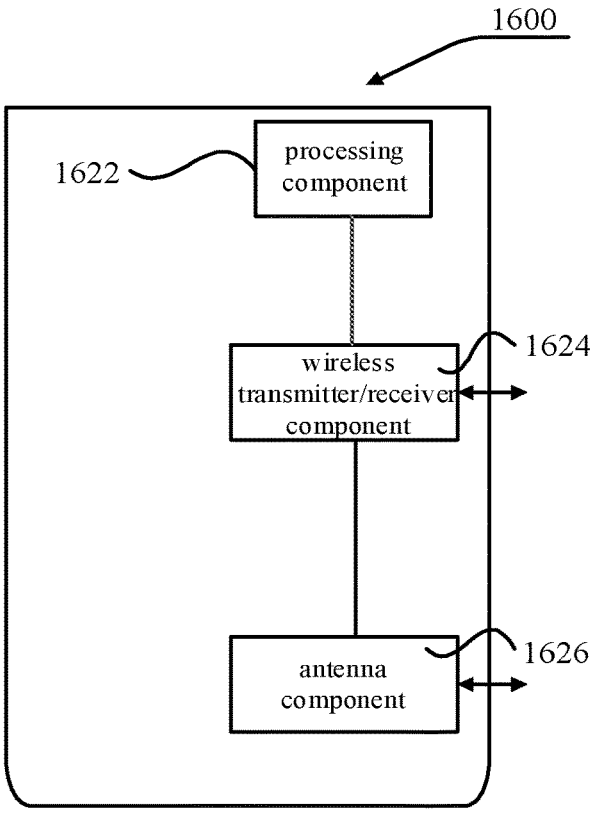
FIG. 16 is a schematic diagram illustrating a structure of another device for determining a paging cause applicable to a base station according to an exemplary embodiment of the present disclosure.

As shown in FIG. 16, FIG. 16 is a schematic diagram illustrating a structure of another device for determining a paging cause according to an exemplary embodiment. The device 1600 may be provided as a base station. As shown in FIG. 16, the device 1600 includes a processing component 1622, a wireless transmitter/receiver component 1624, an antenna component 1626, and a signal processing portion specific to a wireless interface. The processing component 1622 may include one or more processors.

One of the processors of the processing component 1622 may be configured to implement any one of the methods for determining the paging cause performed on the based station side.

Correspondingly, an embodiment of the disclosure also provides an apparatus for determining a paging cause. The apparatus includes:

a processor;

a memory for storing instructions executable by the processor;

in which the processor is configured to implement any one of the methods for determining the paging cause performed on a core network device side.

Figure 17:
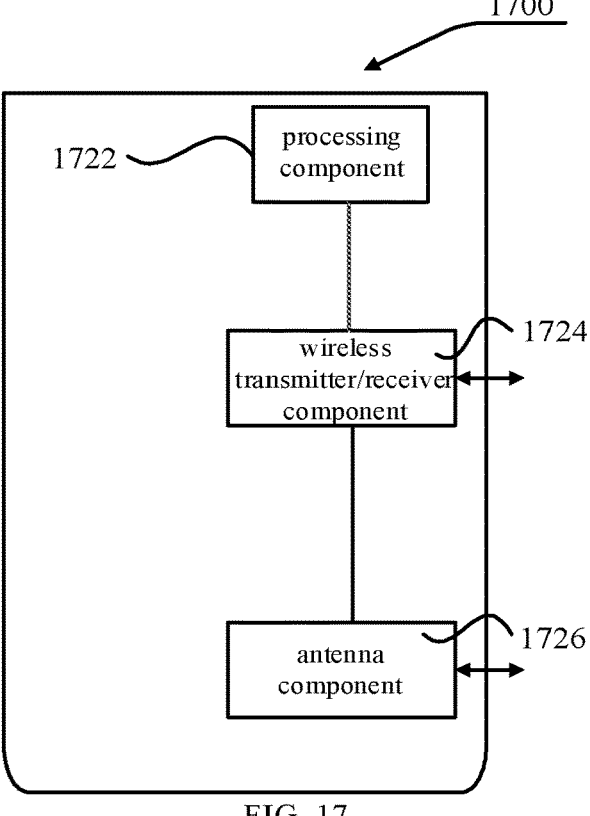
FIG. 17 is a schematic diagram illustrating a structure of another device for determining a paging cause applicable to a core network device according to an exemplary embodiment of the present disclosure.

As shown in FIG. 17, FIG. 17 is a schematic diagram illustrating a structure of another device for determining a paging cause according to an exemplary embodiment. The device 1700 may be provided as a core network device. As shown in FIG. 17, the device 1700 includes a processing component 1722, a wireless transmitter/receiver component 1724, an antenna component 1726, and a signal processing portion specific to a wireless interface. The processing component 1722 may include one or more processors.

One of the processors of the processing component 1722 may be configured to implement any one of the methods for determining the paging cause performed on the core network device side.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for determining a paging cause, performed by a multi-card terminal, comprising:

determining that a first subscriber identity module (SIM) card is in service communication, and receiving a first paging signaling, wherein the first paging signaling is configured to page a second SIM card in an inactive state;

sending a paging cause request to a target base station from the second SIM card, wherein the target base station is a base station covering a region where the second SIM card is presently in, and the paging cause request requests a target paging cause for paging the second SIM card; and determining the target paging cause based on a second paging signaling sent by the target base station, wherein the second paging signaling comprises the target paging cause;

wherein sending the paging cause request to the target base station from the second SIM card comprises one of:

sending the paging cause request to the target base station from the second SIM card using a first signaling, wherein the first signaling is a radio resource control (RRC) signaling, and the first signaling comprises an RRCResumeRequest signaling or an RRCResumeComplete signaling; or sending a reserved preamble as the paging cause request to the target base station from the second SIM card.

2. The method of claim 1, wherein sending the paging cause request to the target base station from the second SIM card using the first signaling comprises:

sending the first signaling to the target base station from the second SIM card after adding the paging cause request to an original or newly added information element of the first signaling.

3. The method according to claim 1, further comprising:

receiving at least one reserved preamble configured by the target base station for the second SIM card as the paging cause request; or determining at least one reserved preamble as the paging cause request according to a predefined setting.

4. A method for determining a paging cause, performed by a target base station covering a region where a second SIM card in an inactive state on a multi-card terminal is presently in, comprising:

paging the second SIM card using a first paging signaling;

receiving a paging cause request sent by the second SIM card;

determining a target paging cause for paging the second SIM card, wherein the paging cause request requests the target paging cause for paging the second SIM card; and sending a second paging signaling comprising the target paging cause to the second SIM card;

wherein receiving the paging cause request sent by the second SIM card comprises one of:

receiving the paging cause request from the second SIM using a first signaling, wherein the first signaling is a radio resource control (RRC) signaling, and the first signaling comprises an RRCResumeRequest signaling or an RRCResumeComplete signaling; or receiving a reserved preamble as the paging cause request from the second SIM card;

wherein in a case that the target base station is different from an anchor base station corresponding to the second SIM card, and the target base station acquires the target paging cause from the anchor base station, the method further comprises:

sending the paging cause request to the anchor base station using a second signaling, wherein the second signaling comprises a RETRIEVE UE CONTEXT REQUEST signaling.

5. The method according to claim 4, wherein, the target base station is different from an anchor base station corresponding to the second SIM card, and determining the target paging cause for paging the second SIM card comprises:

acquiring the target paging cause that has been determined; or acquiring the target paging cause from the anchor base station; or, the target base station is the same as an anchor base station corresponding to the second SIM card, and determining the target paging cause for paging the second SIM card comprises:

acquiring the target paging cause that has been determined; or acquiring the target paging cause from a core network device.

6. The method according to claim 5, wherein acquiring the target paging cause from the core network device comprises:

sending the paging cause request to the core network device; and receiving a third paging signaling sent by the core network device, wherein the third paging signal comprises the target paging cause.

7. The method according to claim 4, wherein sending the second paging signaling comprising the target paging cause to the second SIM card comprises:

sending the second paging signaling to the second SIM card after obtaining the second paging signaling comprising the target paging cause by adding the target paging cause to an original or newly added target information element of a paging signaling, wherein the target information element is an information element for indicating the target paging cause in the paging signaling.

8. The method according to claim 4, before receiving the paging cause request sent by the second SIM card, further comprising:

configuring at least one reserved preamble for the second SIM card as the paging cause request, and sending the at least one reserved preamble to the second SIM card.

9. A method for determining a paging cause, performed by an anchor base station corresponding to a second SIM card in an inactive state on a multi-card terminal, comprising:

receiving a paging cause request, wherein the paging cause request requests a target paging cause for paging the second SIM card; and sending the target paging cause after determining the target paging cause;

wherein receiving the paging cause request comprises:

receiving the paging cause request sent by the second SIM card, wherein the second SIM card is within a coverage range of the anchor base station;

wherein receiving the paging cause request sent by the second SIM card comprises one of:

receiving the paging cause request from the second SIM using a first signaling, wherein the first signaling is a radio resource control (RRC) signaling, and the first signaling comprises an RRCResumeRequest signaling or an RRCResumeComplete signaling; or receiving a reserved preamble as the paging cause request from the second SIM card;

wherein in a case that the target paging cause is acquired by the anchor base station from a core network device, the method further comprises:

sending the paging cause request to the core network device using a third signaling, wherein the third signaling is an RRC signaling, and the third signaling comprises an RRC inactive transition report signaling or an RRC configuration update signaling.

10. The method according to claim 9, wherein receiving the paging cause request comprises:

receiving the paging cause request sent by the target base station, wherein the second SIM card is presently within a coverage range of a target base station different from the anchor base station.

11. The method according to claim 10, wherein acquiring the target paging cause from the core network device comprises:

sending the paging cause request to the core network device;

acquiring a third paging signaling sent by the core network device, wherein the third paging signaling comprises the target paging cause.

12. The method according to claim 9, wherein, the second SIM card is presently within a coverage range of the anchor base station, sending the target paging cause comprises:

sending a second paging signaling comprising the target paging cause to the second SIM card;

or the second SIM card is presently within a coverage range of a target base station different from the anchor base station, sending the target paging cause comprises:

sending a RAN paging signaling comprising the target paging cause to the target base station.

13. A computer readable storage medium having a computer program stored thereon, wherein the computer program is configured to cause the method for determining the paging cause according to claim 1 to be implemented.

14. A computer readable storage medium having a computer program stored thereon, wherein the computer program is configured to cause the method for determining the paging cause according to claim 9 to be implemented.

15. A computer readable storage medium having a computer program stored thereon, wherein the computer program is configured to cause the method for determining the paging cause according to claim 9 to be implemented.

16. An apparatus for determining a paging cause, comprising:

a processor;

a memory for storing instructions executable by the processor;

wherein the processor is configured to implement the method for determining the paging cause according to claim 1.

17. An apparatus for determining a paging cause, comprising:

a processor;

a memory for storing instructions executable by the processor;

wherein the processor is configured to implement the method for determining the paging cause according to claim 4.

18. An apparatus for determining a paging cause, comprising:

a processor;

a memory for storing instructions executable by the processor;

wherein the processor is configured to implement the method for determining the paging cause according to claim 9.

* * * * *